Figure 1:
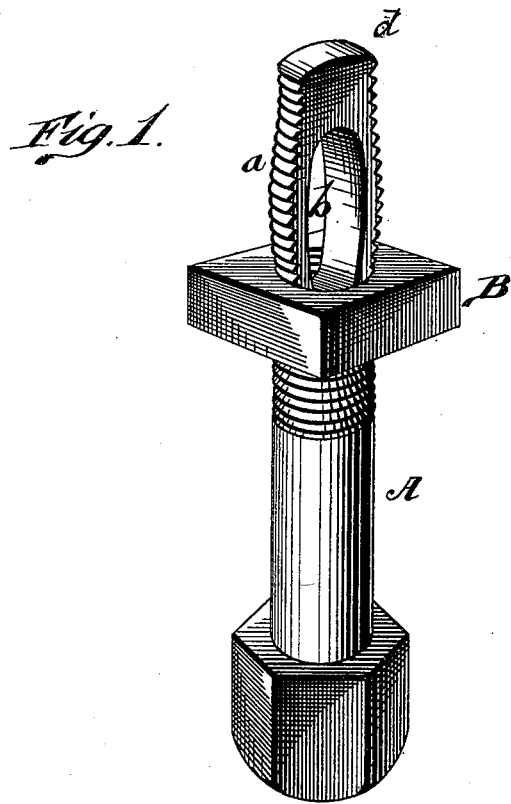

W. LYON.
NUT-LOCKS.

No. 193,717. Patented July 31, 1877.

WITNESSES INVENTOR.

UNITED STATES PATENT OFFICE.

WILLIAM LYON, OF NEWARK, NEW JERSEY.

IMPROVEMENT IN NUT-LOCKS.

Specification forming part of Letters Patent No. 193,717, dated July 31, 1877; application filed June 30, 1877.

*To all whom it may concern:*

Be it known that I, WILLIAM LYON, of Newark, in the county of Essex and State of New Jersey, have invented a new and valuable Improvement in Nut-Locks; and I do hereby declare that the following is a full, clear, and exact description of the construction and operation of the same, reference being had to the annexed drawing, making a part of this specification, and to the letters and figures of reference marked thereon.

The drawing is a representation of a perspective view of my nut-lock.

The nature of my invention consists in the method of locking nuts on slotted bolts, which consists in spreading a portion of the body of the slotted bolt outwardly on opposite sides in rear of the nut, thereby locking the nut on the bolt; also, in a threaded bolt, provided with a longitudinal slot near the end, for the purpose of spreading a portion of the body of the bolt to lock the nut thereon, as will be hereinafter more fully set forth.

The annexed drawing, to which reference is made, fully illustrates my invention.

A represents an ordinary bolt, having screw-threads $a$ on its end. Near this end of the bolt there is a longitudinal slot, $b$, made through the same, as shown. B is the ordinary nut, screwed on the bolt tight up against the article through which the bolt is passed, and after the nut has been thus screwed up a suitable tool is inserted in the slot $b$ outside of the nut, and the bolt spread or bulged outward on opposite sides, whereby the nut is locked firmly on the bolt, and cannot come loose by jarring.

I am aware that a bolt split at the end has been used to be spread apart by a wedge for locking the nut; but in such case there is great difficulty in putting on the nut again after it has been once used.

In my invention there is no such difficulty, as the end of the bolt is solid, as shown at $d$, and thus affords an easy return of the nut, no matter how many times it may have been used.

In some cases a bolt slotted as herein described may be used without a nut, by simply spreading or expanding the bolt at the slot.

This nut-lock is very simple, easily operated, and does not cost any more than the ordinary bolt and nut.

What I claim as new, and desire to secure by Letters Patent, is—

1. The method of locking nuts on slotted bolts, consisting in spreading a portion of the body of the slotted bolt outwardly on opposite sides, whereby the nut is locked on the bolt, as shown and described.

2. The combination of a threaded bolt, formed with solid end $d$ and a slot, $b$, the sides of which are bulged, and a nut, B, substantially as and for the purpose set forth.

In testimony that I claim the above I have hereunto subscribed my name in the presence of two witnesses.

WILLIAM LYON.

Witnesses:
    JOS. C. YOUNG,
    WM. DREHER.